Dec. 16, 1969 E. W. ANTHON 3,484,207
LIQUID SAMPLING-PIPETTING METHOD AND APPARATUS
Filed May 22, 1967 5 Sheets-Sheet 1

INVENTOR
ERIK W. ANTHON

INVENTOR
ERIK W. ANTHON

United States Patent Office 3,484,207
Patented Dec. 16, 1969

3,484,207
LIQUID SAMPLING-PIPETTING METHOD AND APPARATUS
Erik W. Anthon, Kensington, Calif., assignor, by mesne assignments, to American Optical Corporation, Southbridge, Mass., a corporation of Delaware
Continuation-in-part of application Ser. No. 529,784, Feb. 24, 1966. This application May 22, 1967, Ser. No. 640,175
Int. Cl. B01l 3/02
U.S. Cl. 23—253                     4 Claims

ABSTRACT OF THE DISCLOSURE

The pistons of a series of interconnected displacement piston pumps are raised and lowered by the action of interconnected links and lever arms so that the pumps fill and discharge in the desired sequence to effect pipetting operations yielding predetermined volumetric dilutions of a sample with one or more reagents or diluents.

---

This is a continuation-in-part of my application, Ser. No. 529,784, filed Feb. 24, 1966, now abandoned.

This invention relates to a liquid sampling and pipetting apparatus and, more particularly to a manually operated apparatus and method for sampling precise quantities of liquids; transferring the sampled liquids to a receiving station; and thereafter purging the system to eliminate incidence of cross-contamination when the sampling-transfer method is repeated.

Procedures for accurately sampling and pipetting liquids in the laboratory are time-consuming when performed manually. Liquid pipetting equipment in its simplest form requires that the operator sample a liquid either by drawing sample into the tube with a syringe bulb or by mouth and thereafter delivering the measured sample to a receiving station. For large numbers of determinations laboratory sampling and pipetting procedures heretofore employed greatly limit the effectiveness of the laboratory technician. Attempts have been made to automate routine procedures of the laboratory technician and although generally effective, they necessitate the use of expensive and complex equipment.

According to the present invention, a manually operated, highly efficient sampling and pipetting apparatus is now provided which greatly reduces technician error and which provides a relatively simple method for greatly increasing the efficiency of routine sampling and pipetting operations customarily performed in research laboratories, hospitals, industrial installations and the like.

It is an object of this invention, therefore, to provide a manually operated sampling-pipetting apparatus which greatly improves the efficiency of technicians involved in routine analytical procedures.

It is also an object of this invention to provide a liquid sampling and pipetting apparatus, of the character described, which is self-cleaning and which eliminates the incidence of cross-contamination between sampling operations.

It is another object of this invention to provide an apparatus useful for transferring a measured quantity of sample from one position to another by a unique combination of lever and pump mechanisms.

It is yet another object of this invention to provide a relatively simple method for greatly increasing the efficiency in operation of routine sampling and pipetting procedures encountered in research laboratories, hospitals, industrial installations and the like.

These and other objects and advantages of the present invention will become more readily apparent from the following detailed description taken with the accompanying drawings in which.

Figure 1:
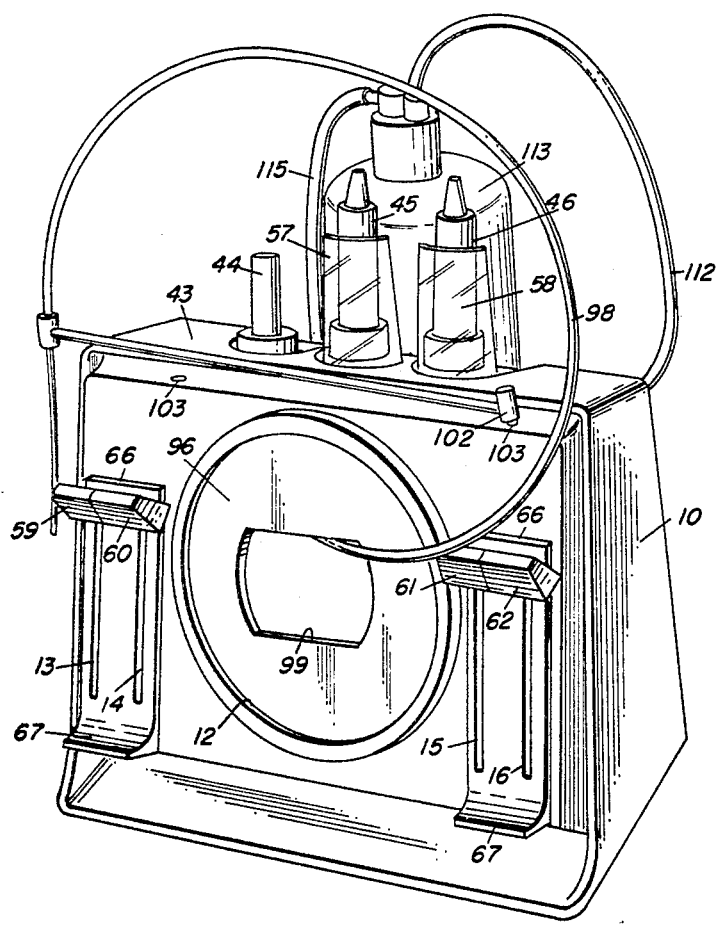
FIGURE 1 is a perspective view of a preferred form of manual pipetting apparatus constructed in accordance with this invention.

In the drawings it will be observed that the apparatus is contained within a main housing 10 of generally rectangular shape having a removable front cover 11 provided with a central circular opening 12 which is flanked on each side by pairs of vertically arranged slotted openings 13, 14, 15 and 16. Projecting forwardly from the central area of the back wall 17 of the housing is a generally horizontal shelf 18 having therein three horizontally aligned spaced openings below which are suspended respectively the cylinders for a reagent surplus pump 19, reagent pump 20 and a sample pump 21, these cylinders being provided at their upper ends with annular outwardly extending shoulders 22, 23 and 24 which enable them to be held in place under the shelf by means of retainer brackets 25, 26 and 27 which are removably held in place by means of threaded screws 28, 29 and 30.

Each of the pumps is of the positive displacement type having basically the same construction although they differ in their volumetric capacity. Projecting downwardly into the three cylinders 19, 20 and 21 are the reagent surplus piston 31, the reagent piston 32 and the sample piston 33 respectively, leakage of fluid being prevented by the use of appropriate seals 34, 35 and 36. The upper ends of the pistons include control rods 37, 38 and 39, each of which is provided respectively with an annularly projecting shoulder 40, 41 and 42. The control rods 37 project upwardly through suitable openings provided in the top 43 of the housing, the upper end of the reagent surplus control rods 38 and 39 project respectively into the interior of a pair of hollow micrometer barrels 45 and 46.

Figures 2, 2A, 2B:
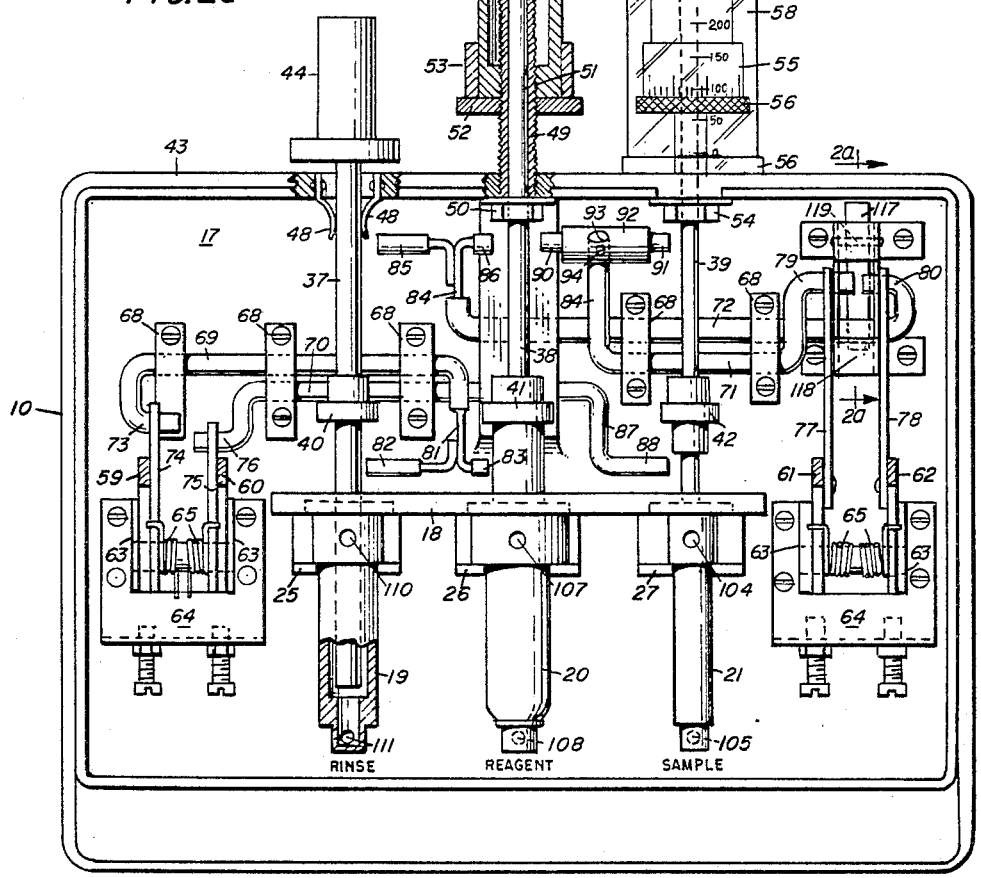
FIGURE 2 is a front elevational view of the interior of the apparatus partly in section with the front cover removed and portions of the operating levers broken away.
FIGURE 2A is a cross-section of the pinch-valve mechanism taken on the line 2A—2A of FIGURE 2.
FIGURE 2B is similar to FIGURE 2A but shows the valve in the open position.

As shown in FIGURE 2, attached to the opening for the reagent surplus control rod 37 in the top of the housing is a friction plate 48 which bears against the side of the control rod for a purpose of resisting unwanted movement of the associated piston. Surrounding the control rod 38, and in threaded engagement with the opening in the top cover is a lead screw 49 having a lock nut 50 below the top plate to secure the lead screw in place. The bore 51 at the lower end of the micrometer barrel 45 is provided with internal threads so that the barrel can be threadly attached to the upper end of lead screw 49 and thus allow for adjusting the vertical height of the barrel to control the stroke of the reagent piston. Once the position of the barrel has been set it is secured by means of a lock nut 52. Surrounding the lower exterior of the barrel is a micrometer dial 53 which may be rotated about the barrel for adjustment to its zero position and locked in place by means of set screws (not shown).

The arrangement for controlling the stroke of the sample pump is similar to that of the reagent pump, the barrel 46 being threadedly secured to a lead screw (not shown) which is held in place by means of the lock nut 54, the lower end of the barrel being provided with an adjustable micrometer dial 55 and provided with a lock nut 56. Mounted on top of the housing in front of each of the barrels is a pair of semi-circular transparent visors 57 and 58, each having scales for setting the vertical position of each of the respective micrometer barrels and thus controlling the volumetric capacity of a single cycle of operation.

Operation of the pumps is exercised through a system of cranks and linkages actuated by four manually operable levers 59, 60, 61 and 62. These levers are pivotally mounted at a point medially of their length on the forwardly projecting ears 63 of a pair of brackets 64 attached to the back wall 17 of the housing, these pivot points being substantially in horizontal alignment with each other. At each of these pivot points there is also provided a biassing means, such as the coil spring 65, one end of which is placed below a lever, the other end of the spring being attached to the bracket to urge each of the levers towards the uppermost position in the slots. The forward ends of the levers project outwardly through the slots 13 through 16 of the front panel. As an aid to depressing the levers, the front cover may be provided with a pair of escutcheon plates 66 surrounding the slots and having forwardly projecting finger grips 67 at their lower ends.

Rotatably secured to the back wall of the housing, as by means of straps 68, are four horizontally extending crank mechanisms 69, 70, 71 and 72. One end 73 of the crank 69 is re-entrantly curved back to provide an arm spaced forwardly from, but parallel with, the main body of the crank and is pivotally received in an opening at the upper end of a link 74, the lower end of this link being pivotally attached to the rear end of lever 59. Link 75 is pivotally connected at its lower end with the rear end of lever 60, the upper end of this link having an opening through which the offset arm 76 of crank 70 is received. In a similar fashion the links 77 and 78 are provided with an opening at their upper ends through which respectively the offset arm 79 of crank 71 and the re-entrantly turned arm 80 of crank 72 are received, the lower end of these links being pivotally connected respectively with levers 61 and 62.

Figure 3:
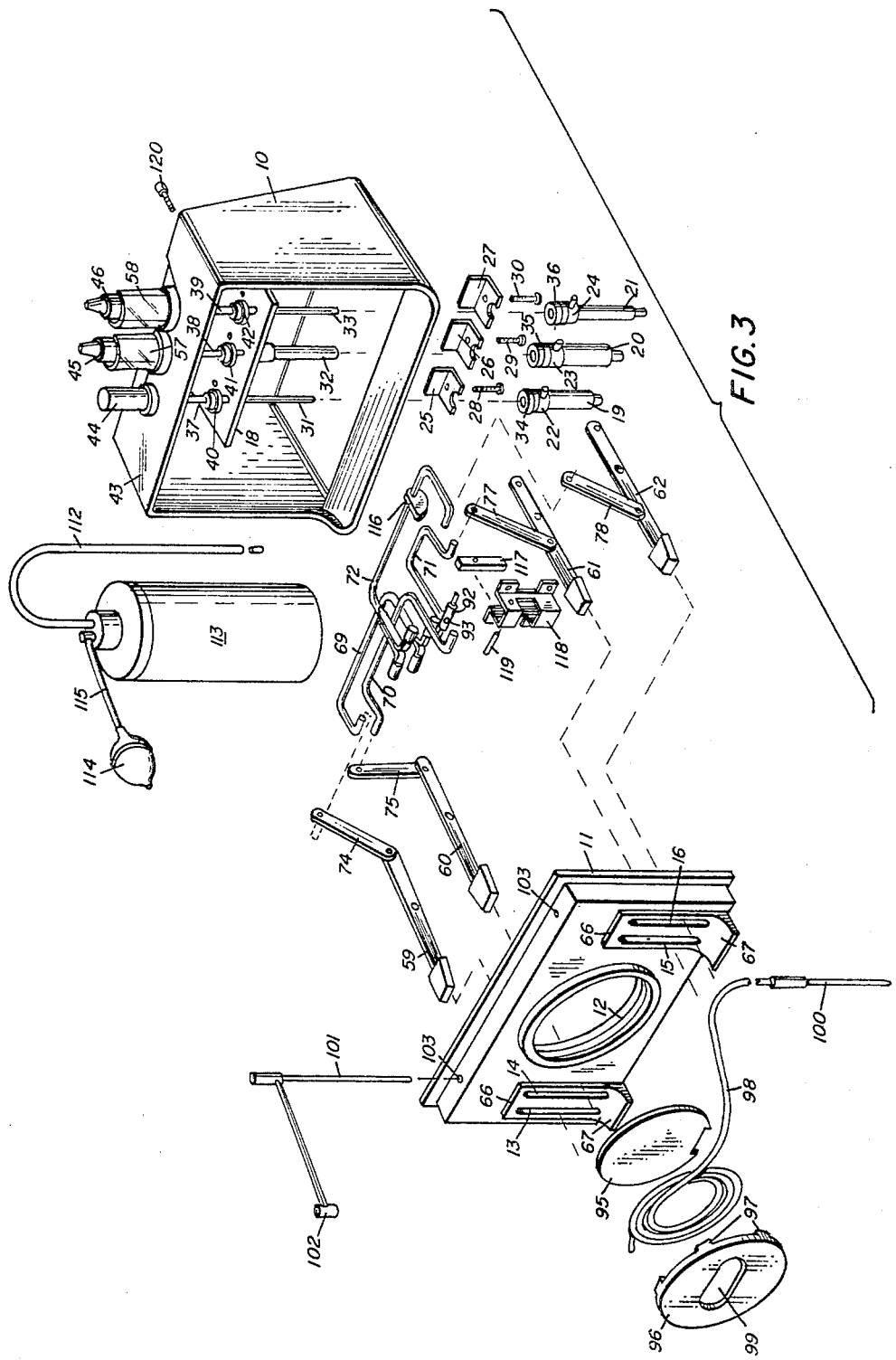
FIGURE 3 is an exploded view of the apparatus showing the relationships between the various elements.
Figure 4:
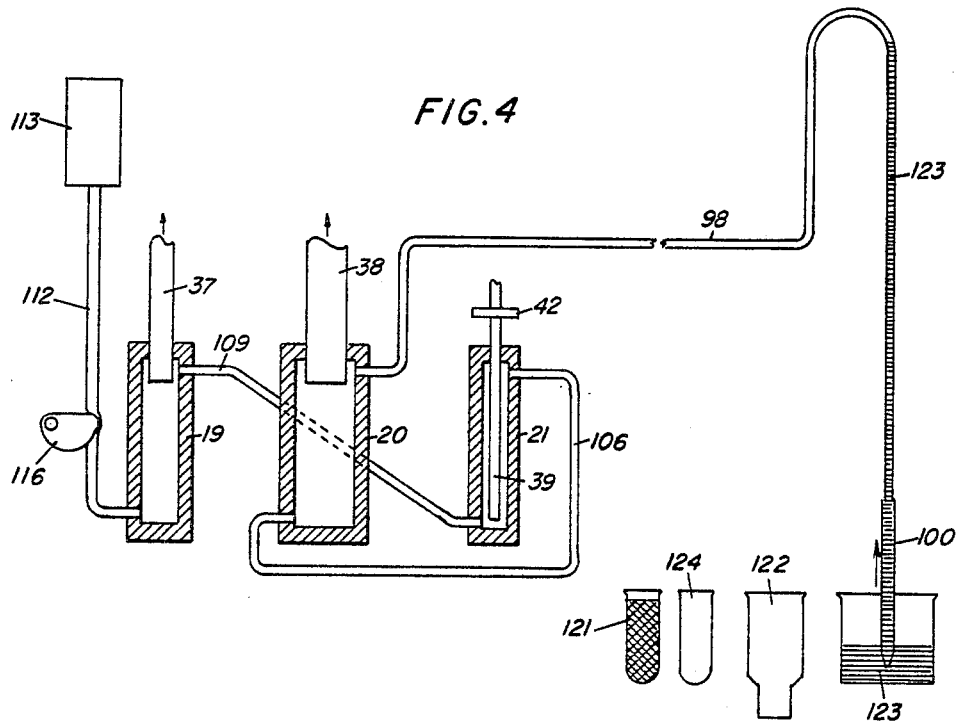
FIGURES 4 through 7 are diagrammatic views of the fluid system of the apparatus illustrating each of the steps involved in one type of sample testing operation.

It should be noted that, in contradistinction to the first two links, the links 77 and 78 are connected to their respective levers at points spaced forwardly of the pivot point of each lever rather than at their rear ends. The effect of this arrangement is that whatever the levers 59 and 60 are depressed the respective cranks 69 and 70 will rotate in a clockwise direction as viewed from the right end in FIGURE 3 whereas when levers 61 and 62 are depressed the respective cranks 71 and 72 will be rotated in a counterclockwise direction.

The other end of crank 69 is bent at right angles to provide a forwardly projecting arm 81 having at its extremity a pair of fingers 82 and 83 extending in opposite directions and arranged for contact with the undersides of the shoulder 40 and 41 of the respective buffer and reagent pistons. It will thus be seen that when lever 59 is depressed the reagent surplus and reagent pistons will be raised an equal distance through the actuation of crank 69 by the link 74.

The other end of crank 70 is bent at right angles to provide a forwardly projecting arm 89, the extremity of which is provided with a pair of oppositely projecting fingers 90 and 91 positioned at opposite ends of a bar 92 having a transverse opening 93 enabling it to be mounted on the end of the arm 89 for limited reciprocatory rotation about an axis concentric with that of the arm itself, this reciprocatory movement being controlled by means of a set screw 94 which projects into a peripherally arranged recess (not shown) in the arm. Fingers 90 and 91 are arranged for operative engagement with the upper portions of shoulders 41 and 42, so that when crank 71 is rotated downwardly by lever 61 through the connecting link 77 both the reagent and sample pistons will be depressed. The provision of limited swinging movement of the bar 92 ensures that each of these pistons will be depressed to its fullest extent despite the fact that at their lowermost positions the vertical levels of the respective shoulders 41 and 42 might be slightly different due to slight inaccuracies of adjustment.

Supported in the rear of the opening 12 in the front cover is a circular back plate 95 while another plate 96, which is preferably transparent, may be removably secured within the opening but spaced forwardly from the back plate as by means of spacer lugs 97. Preferably the space between the plates should be just sufficient to confine a single layer of spirally coiled flexible tubing 98 between them. A horizontally elongated opening 99 is provided in the front plate through which a suitable length of tubing 98 may be withdrawn. The end of the tube is drawn to a small diameter tip and surrounded by a stiffening member for easier handling thus forming the pipette 100. A pipette holder 101 having an arm provided with a socket 102 for a pipette may be mounted in either one of two openings 103 provided at the top of the front cover. Conventional friction brake means (not shown) may also be provided to allow for adjustable positioning of the pipette holder.

For clarity in viewing the mechanical elements of the apparatus, the fluid connecting lines have not been shown in the first four views of the drawings but these connections are clearly shown in FIGURES 4 through 7 and thus it will be seen that the other end of tubing 98 is connected to an orifice 107 provided at the upper end of the reagent cylinder for communication with the interior of the cylinder. At the lower end of the reagent cylinder there is provided another orifice 108 communicating with the interior of the cylinder and to this orifice there is connected one end of a short length of tubing 106, the other end of which is attached to an orifice 104 at the top of the sample cylinder 21. Another orifice 105 at the bottom of the sample cylinder is connected by a tube 109 to the orifice 110 provided at the top of the reagent surplus cylinder 19. Connected to the lower orifice 111 of the buffer cylinder there is a length of tubing 112 which passes out through an opening (not shown) in the back of the housing for connection with a fluid container 113 which, for many applications, may contain a rinsing liquid, such as distilled water, to be supplied to the apparatus under pressure through the tubing 112. The container may be supported above the level of the remainder of the apparatus so as to supply the liquid by means of hydrostatic pressure or any other suitable means may be provided for pressurizing the interior of the container. One such means would include a simple manually operable squeeze bulb 114 having the usual check valve, for supplying air under pressure through the tube 115.

The admission of fluid from container 113 into the apparatus is under the control of a pinch valve means which includes a camming element 116 secured on the crank 72 at a position just behind the adjustable valve lever 117 which is pivotally supported in a box shaped bracket 118 by means of pin 119, the flexible tube 112 being confined between the lever and cam by the bracket which, in turn, is attached to the back wall of the housing adjacent the upper right-hand corner. The lever may swing on the pin 119 towards and away from the cam element 116, the position of the lever being controlled by means of an adjusting screw 120.

The apparatus disclosed in this application is capable of operating in several modes, such as (1) picking up and dispensing a predetermined amount of sample and a predetermined amount of reagent, when a different reagent is to be used in each cycle; (2) picking up and dispensing a predetermined amount of sample and a predetermined amount of reagent, when the same reagent is used for each cycle; (3) picking up and dispensing a predetermined amount of a single liquid. However, certain preliminary steps should be taken, particularly to eliminate any air from the tubing and pumping system, prior to performing any laboratory procedure.

The container 113 should be filled about ¾ full with a rinse liquid (such as distilled water) being sure that the filler cap is replaced tightly to preserve air pressure. Next the reservoir should be pressurized by the use of the squeeze bulb 114. Remove the pipette 100 from its holder 101 and the amount of tubing which it is desired to use from behind the plate 96.

Next, depress the lever 62 downwardly and hold it in its fully depressed position. As previously explained the depression of lever 62 causes rotation of the crank 72 in a counterclockwise direction as viewed from the left in FIGURE 2 and in the fully depressed position, this rotation will cause the cam element 116 to rotate to the position shown in FIGURE 2b thereby releasing force on tubing 112 and allowing liquid under pressure from the container to pass through the system. Since there are no valves (other than the pinch valve) in the system, the liquid will first pass through cylinder 19 then into cylinder 21 through tube 109 into cylinder 20 through tube 106 and finally into the pipette through tubing 98. This flow should be allowed to continue until it is observed that there are no more bubbles showing in the tubing 98.

After the preliminary rinsing of the apparatus has been accomplished, the following procedure is recommended for picking up and dispensing predetermined volume of sample and reagent, particularly if it is desired to change reagent frequently. In this mode all three pumps are used and the reagent is discharged during the rinsing step at the end of every cycle allowing the reagent to be changed immediately. First, arrange the sample, indicated in FIGURES 4 through 7 by numeral 121, waste drain, indicated by numeral 122, container containing reagent, indicated by numeral 123, and the rack containing test tubes 124 conveniently around the instrument. Experience will soon establish the proper location of each.

Figure 5:
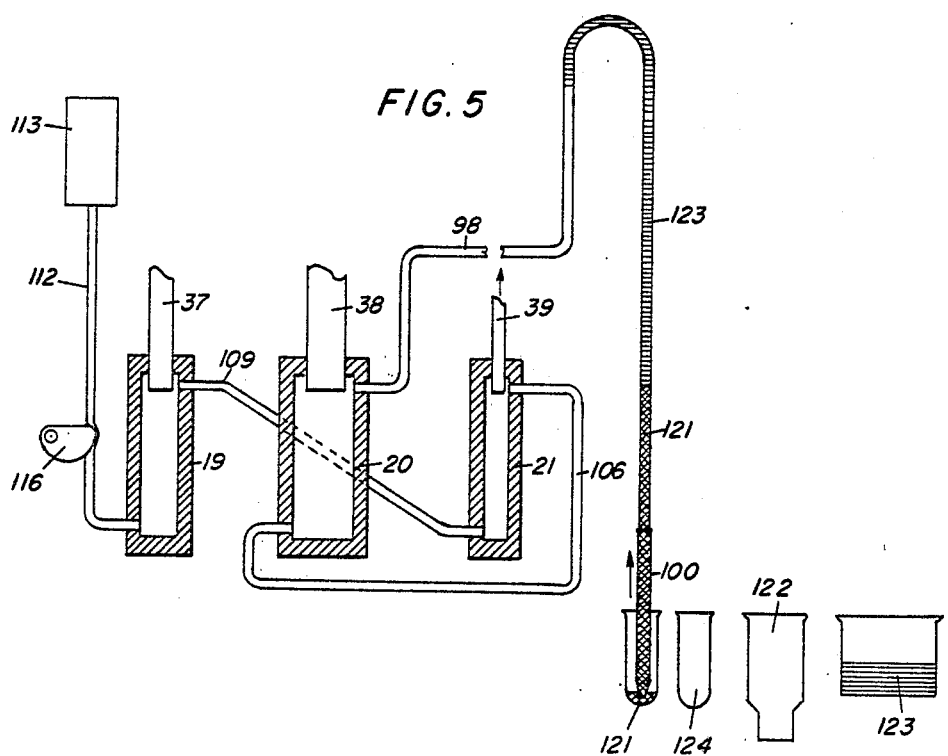
Figure 6:
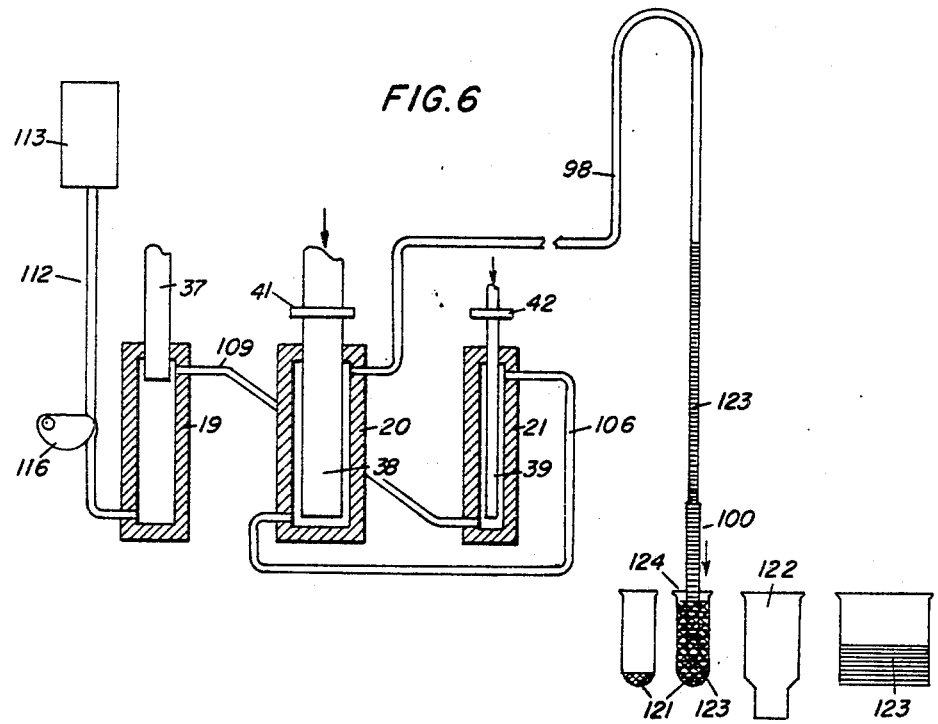

Next, set the micrometer barrel 45 for the volume of reagent that is is desired to add to the sample and lock it by means of the nut 52; also set the micrometer barrel 46 for the volume of sample that is to be used and lock it with the lock nut 56. Direct the pipette tip at a waste drain and press lever 62 fully down and release sharply. The abrupt termination of the flow will cause an oscillation of the liquid (water hammer) which results in the formation of a small air bubble at the tip of the probe 100. Next, place the pipette tip in reagent and press lever 59 fully and firmly down. This raises pistons 31 and 32 to draw in reagent equal to the set volume of these two pumps. The reagent is represented by horizontal lines in tube 98. When the bubble separating the rinse liquid from the reagent stops circling in the pipette tube 98, remove the pipette and wipe the tip. Dip probe 100 into the sample liquid 121 and press the lever 60 fully down. This raises piston 33 to draw sample into the system equal to the set volume of this pump as shown in FIG. 5. Sample is represented by cross-hatching in tube 98. After the lever has been released withdraw the pipette gently and wipe the tip. Direct the pipette tip against the inner surface of a test tube 124 as shown in FIG. 6 and press lever 61 fully and firmly down. This lowers pistons 32 and 33 to dispense all of the sample plus an amount of reagent equal to the set volume of pump 20 only. A certain amount of reagent will remain because reagent was drawn in by pumps 19 and 20 but discharged by pumps 20, the reagent remaining equals intake volume of pump 19.

Figure 7:
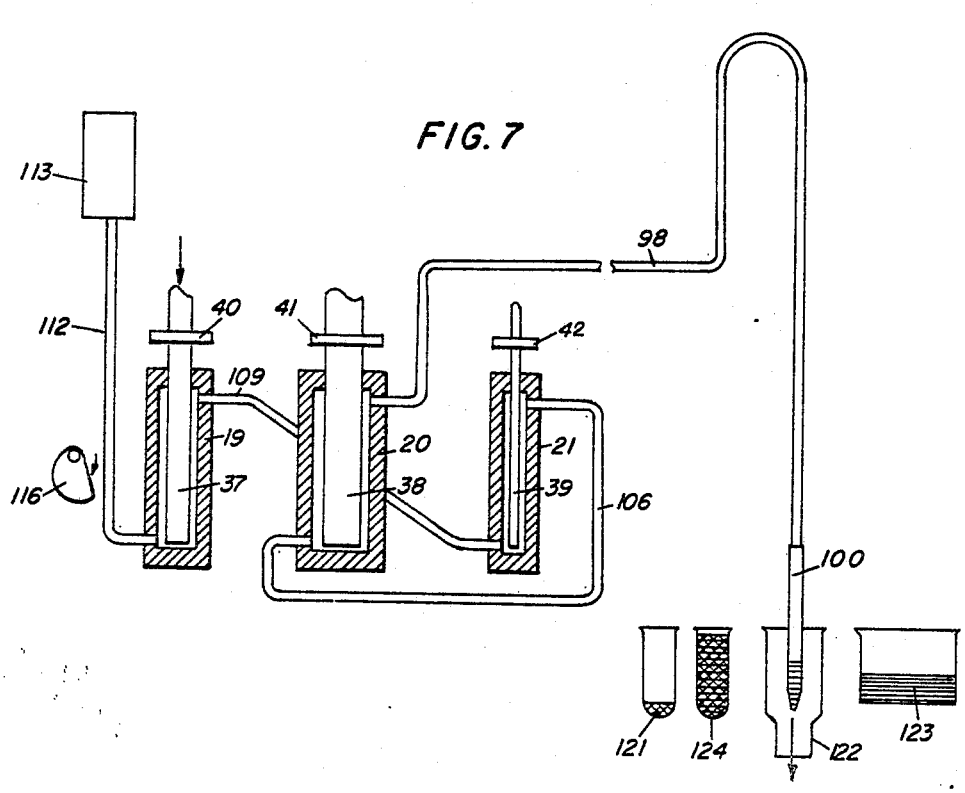

Finally, direct the pipette tip at a waste container as shown in FIG. 7 and press lever 62 fully down and hold it down, pushing the remaining piston 31 down and opening pinch valve cam 116 until all the surplus reagent has been discarded and the pipette has been adequately rinsed by the liquid from container 113. It will be noted, by reference to FIGURE 2, that although piston 32 was pushed down in a previous cycle, there is also a finger 86 which may engage the shoulder 41 during this movement. This is provided because it has been found that under certain conditions there may be a tendency for piston 32 to rise when piston 31 is being lowered. After the tip has been wiped the pipette is ready for the next cycle.

If a single reagent is to be used with successive samples, reagent may be conserved by eliminating the rinsing step, controlled by lever 62. In other words, after the initial rinsing step, the reagent and sample may be drawn in as before by successive actuation of levers 59 and 60; thereafter, lever 61 is depressed to deliver sample and reagent. This may be repeated until the surplus reagent becomes ineffective as a separator between the wash fluid and the delivered reagent because of dilution with rinse fluid, at which point lever 62 may be depressed to rinse the system. The number of cycles between rinsing will vary according to the liquids used.

If the apparatus is to be used for dispensing measured amounts of reagent only, it can be done by drawing in the reagent by depressing lever 59 and dispensing the reagent by means of lever 61. The initial operation of lever 59 draws in reagent equal to the volume of pumps 19 and 20, while initial operation of lever 61 depresses only piston 32 (and piston 33 if it is not already in its lower position). Successive operation of levers 59 and 61 are effective only to raise and lower piston 32 because piston 31 remains raised and piston 33 reamain lowered. Therefore, only at the beginning of the procedure is excess reagent drawn in and this excess remains until the system is rinsed.

In summary, it will be seen that the apparatus herein disclosed comprises essentially a single unobstructed liquid system including a contractible and expansible positive displacement bidirectional pumping means connected with a tubular reservoir means terminating in a pipette tip, the volumetric capacity of the pumping means being preferably less than that of the reservoir means so that liquids drawn into the pipette tip do not pass beyond the reservoir means into the pumping. The pumping means, being capable of drawing in, and discharging, repetitively, precisely measured amounts of either a single liquid or successive measured amounts of more than one liquid. At the same time a buffer liquid can be maintained in the system for preventing entrance of the measured liquids into the pumping means while, in addition, this buffer liquid may be added in unlimited amounts to purge the system of other liquids when desired, as when it is desired to rinse the system between the drawing in of successive different reagents.

Having disclosed a preferred form in which the invention may be practiced, it will be understood that various changes and improvements may be made which would come within the scope of the annexed claims.

I claim:
1. A liquid pipetting apparatus including
   a plurality of reciprocating positive displacement pumps each including a piston movably disposed relative to a double-ported pump body,
   said pumps being connected to form a series fluid path therethrough,
   the first of said pumps being also in communication through a valved first conduit with a liquid reservoir,
   the last of said pumps being also in communication through a second conduit with a pipette,
   said apparatus defining a single continuous liquid flow path from said reservoir to said pipette,
   means to actuate the valve in said first conduit to break fluid communication between said liquid reservoir and said first pump, and
   actuation means to selectively move said pistons to enlarge the chambers in said pump bodies to draw liquid into said pipette when the same is immersed.
2. A liquid pipetting apparatus as defined in claim 1 in which said second conduit has a fluid capacity greater than the total displacement of all of said pumps to prevent back-flow of the liquid in which said pipette is immersed into said pumps.

3. A liquid pipetting apparatus as defined in claim 1 further including means to adjust the limits of reciprocating motion in at least one of said pumps to control the displacement thereof.

4. A liquid pipetting apparatus including a liquid reservoir, a first conduit, a plurality of double-ported reciprocating positive displacement pumps, a second conduit, and a pipette, all connected in series to define a single continuous liquid flow path,
- a valve in said first conduit,
- means to motivate liquid from said reservoir through said flow path when said valve is open,
- said second conduit having a fluid capacity greater than the total displacement of all of said pumps, and said pumps including means to selectively actuate the same and at least one of said pumps including means to adjust the limits of reciprocating motion to control the displacement thereof.

References Cited

UNITED STATES PATENTS

| | | | |
|---|---|---|---|
| 3,192,968 | 7/1965 | Baruch et al. | 23—259 XR |
| 3,192,969 | 7/1965 | Baruch et al. | 23—259 XR |
| 3,197,285 | 7/1965 | Rosen | 23—253 |

MORRIS O. WOLK, Primary Examiner

R. E. SERWIN, Assistant Examiner

U.S. Cl. X.R.

23—259; 73—425.6; 141—23; 222—135, 148, 309